United States Patent [19]
Kianta et al.

[11] Patent Number: 5,641,334
[45] Date of Patent: Jun. 24, 1997

[54] METHOD AND FURNACE FOR BENDING GLASS SHEETS IN A SERIES

[75] Inventors: Esko Kianta; Rauno Salonen, both of Ylöjärvi, Finland

[73] Assignee: Lamino Oy, Tampere, Finland

[21] Appl. No.: 411,783

[22] PCT Filed: Jun. 23, 1994

[86] PCT No.: PCT/FI94/00283
 § 371 Date: May 10, 1995
 § 102(e) Date: May 10, 1995

[87] PCT Pub. No.: WO95/04707
 PCT Pub. Date: Feb. 16, 1995

[30] Foreign Application Priority Data

Aug. 10, 1993 [FI] Finland ................ 933518

[51] Int. Cl.$^6$ .................................. C03B 25/02
[52] U.S. Cl. .................. 65/118; 65/106; 65/107; 65/146; 65/258; 65/273; 65/281; 65/286; 65/289; 65/361
[58] Field of Search ............... 65/106, 107, 118, 65/146, 258, 273, 286, 289, 361, 281; 198/621.1, 742; 414/154, 172, 180, 188, 786

[56] References Cited

U.S. PATENT DOCUMENTS

| | | | |
|---|---|---|---|
| 2,452,488 | 10/1948 | Paddock et al. | 65/273 |
| 2,933,180 | 4/1960 | Dixon et al. | 198/621.1 |
| 3,301,374 | 1/1967 | Proctor | 198/742 |
| 4,289,521 | 9/1981 | Schymura | 65/361 |
| 4,497,645 | 2/1985 | Peltonen. | |
| 4,688,668 | 8/1987 | Ookuba et al. | 198/621.1 |

FOREIGN PATENT DOCUMENTS 68390 1/1985 Finland.

Primary Examiner—Donald E. Czaja
Assistant Examiner—Michael Philip Colaianni
Attorney, Agent, or Firm—Law Offices Pollock, Vande Sande & Priddy

[57] ABSTRACT

The invention relates to a method in a sequential bending furnace for bending glass sheets. According to the method, carriages are advanced in the furnace into a section downstream in the traveling direction of the carriages for a subsequent bending cycle essentially by using at least two transfer assemblies, providing a transfer mechanism and including first and second locking elements which are in a transfer-force transmitting relationship during the course of a transfer. This is followed by disengaging the locking elements and then transfer and locking rods included in the transfer assemblies are returned to a transfer commencing position in such a manner that at least one transfer assembly is in a locking position during transfers. Finally, the second locking elements included in the transfer and locking rods returned to the position for commencing a transfer of the carriages are clamped to the first locking elements of the carriages for a subsequent transfer of the carriages effected between the sections.

19 Claims, 4 Drawing Sheets

METHOD AND FURNACE FOR BENDING GLASS SHEETS IN A SERIES

BACKGROUND OF THE INVENTION

The present invention relates to a method in a sequential bending furnace for bending glass sheets. A furnace for applying the method includes a sequence of successive sections, at least some of which are provided with heating elements for applying a thermal effect to a glass sheet to be bent for heating and bending it sequentially in the sections. The furnace is further provided with a sequence of successively arranged carriages or the like, fitted with wheels or other conveying elements and mounted on a transfer track or a like. The glass sheets to be bent are laid to be supported by bending molds or the like associated with the carriages or the like. The furnace is further accompanied by a transfer mechanism for carrying the carriages or the like simultaneously forward in the furnace into a section further away in the advancing direction of the carriages for the next bending operation.

As for the prior art, reference is made e.g. to Finnish patent 68390. This patent discloses a solution which is essentially consistent with the presently known state of the art.

The present invention is particularly a result of the ever increasing demands set on the current production technology. The currently applied production technology requires an improved smoothness for and control over movements of the carriages as well as an extremely precise parking accuracy. In particular, the carriages may not be allowed to move during the bending cycles effected in the sections. In addition, especially the transfer mechanism must be readily serviceable without interfering with the actual bending process. It is especially the demands for parking accuracy as well as for preventing the uncontrolled movements of carriages during the bending sequences effected in the sections which require that a thermal expansion effect caused by temperature fluctuations must not interfere with operation of the transfer mechanism or parking accuracy of the carriages. The above problems are abundant in sequential bending furnace designs according to the prior art. Thus, as a whole, the production technology is far from being controlled and continuous to the extent required by the investments made in production technology or engineering.

SUMMARY OF THE INVENTION

An object of this invention is to eliminate as totally as possible the above problems in sequential bending furnaces. In view of achieving the above object, the method is primarily characterized in that a transfer of the carriages or the like is effected as follows:
    the furnace is provided with at least two essentially extra-furnace transfer assemblies for building a transfer mechanism, each transfer assembly comprising
        at least one first locking element in each carriage mounted on a bracket member or a like included in the carriage and communicating with the exterior of the furnace in such a manner that the first locking element is located outside the furnace,
        a transfer and locking rod, extending essentially in the advancing direction of the carriages or the like and located in alignment with essentially all successive jointly operated carriages and fitted outside the furnace, and
    second locking elements associated with the transfer and locking rod and arranged in the longitudinal direction of the transfer and locking rod at fixed spaces in a manner to provide a transfer and locking force transmitting relationship with the first locking elements included in the carriages, whereby
        the carriages or the like are advanced in the furnace into a section downstream in the traveling direction of the carriages essentially by operating at least one transfer assembly, the first and second locking elements being in the relationship transmitting a transfer force in at least one transfer assembly,
        the locking elements are released and the transfer and locking rods of the transfer assemblies are returned to a transfer commencing position in such a manner that at least one transfer assembly is in the locking position during the return actions, and
        the second locking elements included in the transfer and locking rods returned to the position for commencing the transfer of carriages are clamped to the first locking elements included in the carriages or the like for the next transfer of carriages or the like between the sections.

The above-described methodical and technical solution provides several benefits. First of all, the transfer assemblies, and thus the entire transfer mechanism, are located essentially completely outside a furnace whereby the furnace temperature fluctuations cannot affect the operation of the transfer mechanism, e.g. by causing a substantial thermal expansion in the transfer mechanism and especially in the transfer and locking rods. Secondly, when a transfer assembly, which effects a transfer movement, is located in a preferred central position or when, according to one preferred embodiment, the number of transfer assemblies is two or more and all of those are employed in the sequential transfer of carriages, the transfer process can be carried out with a high precision. Furthermore, during the course of a transfer, the carriages can be progressed forward along the transfer track in a controlled fashion without interferences. Thirdly, and very importantly, at least one transfer assembly, when the successive jointly operated carriages have been advanced into a subsequent section, is returned to the initial position (e.g. alternately, when there are more than one transfer assemblies in operation) for a transfer-force transmitting relationship with carriages that are further back and to be transferred later in a manner that the return action is performed with the carriages always locked securely e.g. to at least one transfer assembly during the return action of other transfer assemblies to be returned. This action ensures that the carriages position themselves accurately relative to a section carrying out a particular bending cycle and remain stationary relative to that section during this bending cycle.

The invention relates also to a sequential bending furnace which is primarily characterized in that a transfer mechanism associated with the sequential bending furnace includes at least two transfer assemblies, comprising
    at least one first locking element in each carriage mounted on a bracket member or a like included in the carriage and communicating with the exterior of the furnace in such a manner that the first locking element is located outside the furnace,
    a transfer and locking rod, extending essentially in the advancing direction of the carriages or the like and located in alignment with essentially all successive jointly operated carriages and fitted outside the furnace,
    second locking elements associated with the transfer and locking rod and arranged in the longitudinal direction of the transfer and locking rod at fixed spaces in a manner to provide a transfer and locking force transmitting relationship with the first locking elements included in the carriages, first elements for advancing successive carriages or the like in the furnace into a section downstream in the traveling direction simultaneously by means of the longitudinal transfer action of the transfer and locking rod, the first and second locking elements in at least one transfer assembly being in a transfer-force transmitting relationship, and second elements for opening and closing the transfer and locking force transmitting relationship established between the carriages and the transfer and locking rod by means of the locking elements.

The above-described sequential furnace solution is capable of providing the above methodical and technical benefits.

BRIEF DESCRIPTION OF THE DRAWINGS

The invention will now be described in more detail with reference made to the accompanying drawings. In the drawings.

DETAILED DESCRIPTION OF THE PREFERRED EMBODIMENT

Figure 1:
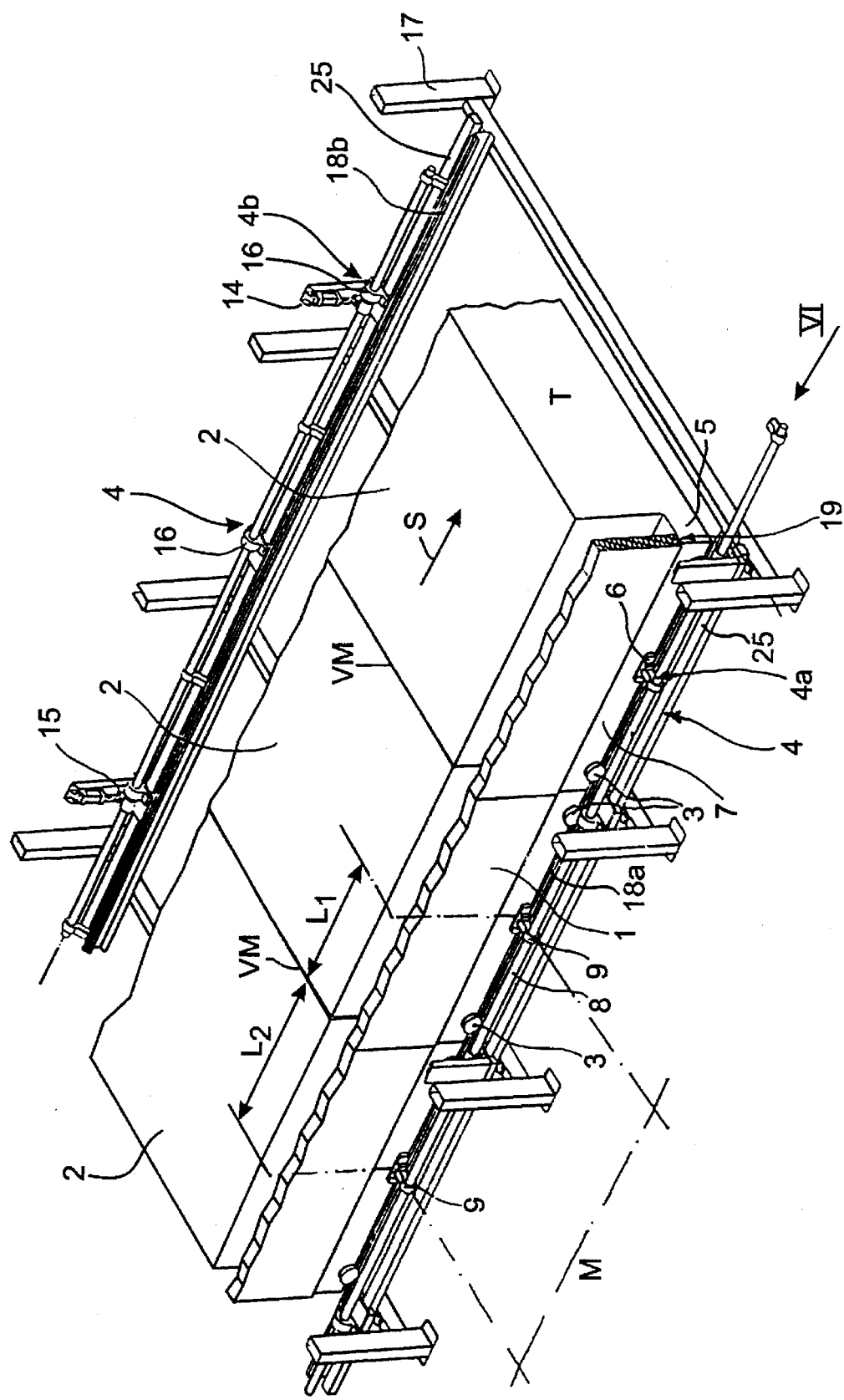
FIG. 1 shows a schematic perspective view of one embodiment for a sequential bending furnace, whereby FIG. 1 only depicts the components that are significant for the essential features of the invention.

FIG. 1 shows schematically and in a perspective view one sequential bending furnace for applying a method of the invention. The sequential bending furnace may be structurally exactly similar to that disclosed e.g. in the publication FI-689390 as far as the general configuration is concerned; FIG. 1 only depicts a portion of a furnace whose general configuration constitutes an elongated space surrounded by longitudinal side walls and a roof included in the furnace. In order to further clarify the furnace, FIG. 1 only illustrates a side wall 1, which is the first wall when looking in the direction of FIG. 1. It should be noted that the construction on the other longitudinal side is also identical to what is shown in FIG. 1 regarding the structure of the first side wall 1.

The furnace is provided successively with carriages 2, three of which are shown in FIG. 1. Naturally, the number of carriages 2 varies within the functional and structural confines of a particular furnace.

An elongated space defined by the furnace walls includes a series or a sequence of successive sections (not shown). At least some of these sections are provided with heating elements for applying a thermal effect to glass sheets (not shown in FIG. 1) placed on top of bending molds associated with a functional element T of the carriages 2. In each section, a glass sheet to be bent is subjected to the sequence of an overall glass-sheet bending process preprogrammed to be effected during this particular bending cycle, the overall bending process being effected by advancing the glass sheets simultaneously in the furnace to a next section further away in the progressing direction of carriages for a subsequent bending cycle.

The carriages 2, having a general configuration which, especially in terms of the functional element T, may vary within technical aspects known to a skilled person, are provided, for carrying out the transfer actions, with conveying elements, especially with a pair of wheels 3 mounted on both sides of the carriages. The furnace is further provided, in conjunction with the conveying elements 3, with a transfer track 18a, 18b along which the carriages 2, carried by the wheels 3, advance during the sequential bending process effected throughout the sections.

For carrying out a sequentially effected simultaneous transfer of the carriages 2, the furnace is accompanied by a transfer mechanism 4. According to the invention, the transfer mechanism 4 comprises at least two essentially extra-furnace transfer assemblies 4a, 4b. In the embodiment of FIG. 1, the number of transfer assemblies 4a, 4b is two. Those assemblies are mounted essentially outside the furnace along the opposite longitudinal (transfer direction, an arrow S) sides in connected with bracket members 5 included in the carriages 2. It is obvious that the number of transfer assemblies 4a, 4b can be more than two and the locations thereof, within the basic concept of the invention, may be different from those shown in the illustrated embodiment. However, it should be noted that the location of transfer assemblies 4a, 4b along the sides of the carriages outside a furnace is preferred in several sequential bending furnace constructions, since temperature fluctuations along the sides of a furnace are relatively insignificant or the effects thereof are readily compensable. In addition, the sealing between the furnace side walls 1 and the bracket members 5 can be achieved in a simple manner.

Each transfer assembly 4a, 4b includes at least one first locking element 6 in each carriage 2. The locking element 6 is mounted on a vertical side surface 7 of the bracket member 5 extending longitudinally of the furnace. The side surface of the bracket member 5 lies outside the furnace, e.g. substantially flush with or beyond the outer surface of the furnace side walls. What is meant by the term "outside the furnace" is that there is an insulating material layer between the furnace interior, wherein the bending processes are effected, and "the furnace exterior" especially in the bracket member 5. The first locking element 6 may be designed in the form of a wedge-shaped groove or spline.

Figures 6, 7:
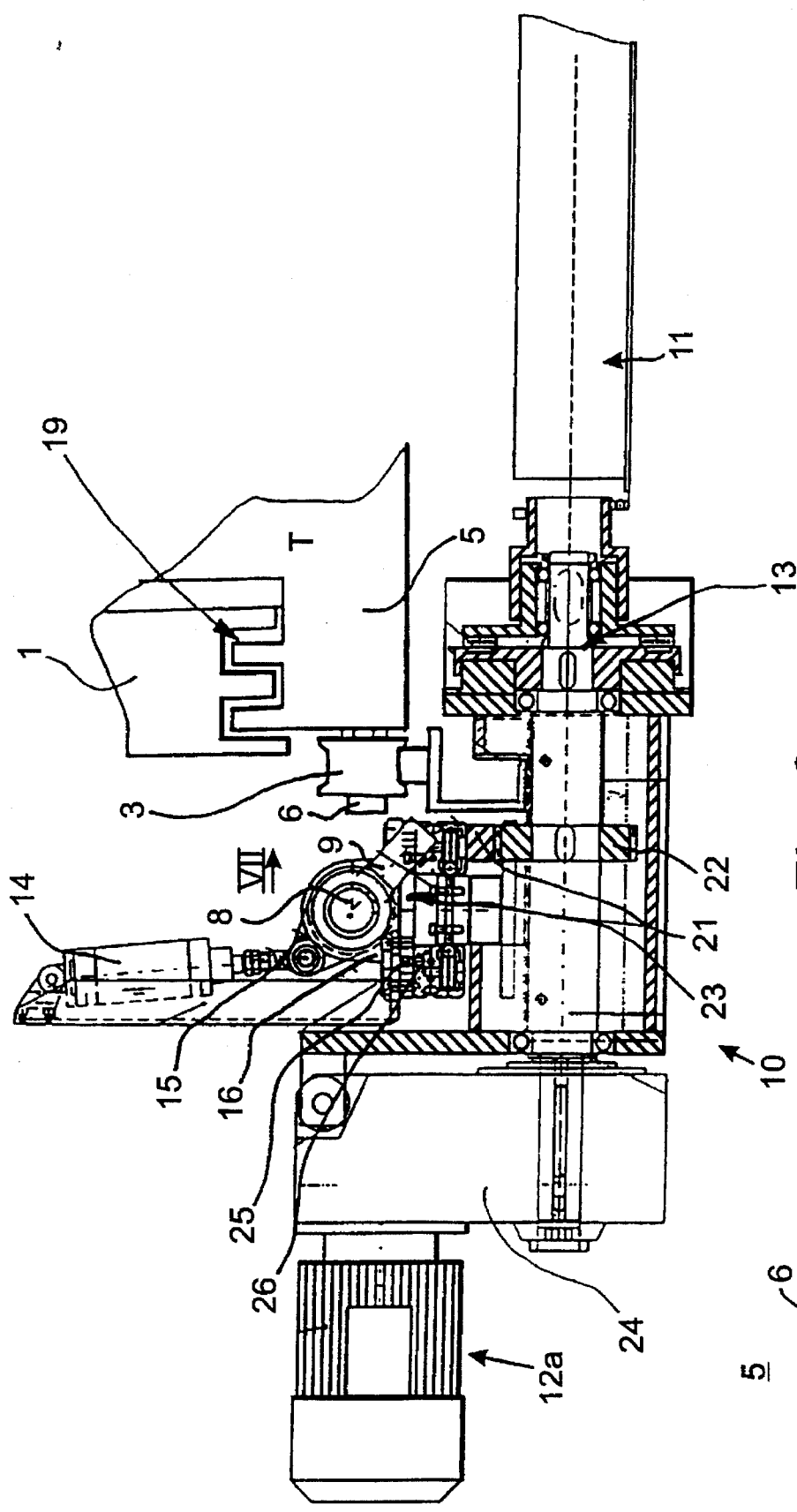
FIG. 6 shows a cross-section of the essential elements included in the transfer assembly of FIGS. 1–5 as seen in the direction VI in FIG. 1.
FIG. 7 shows a coupling between the locking elements in a section looking in the direction VII in FIG. 6.

Furthermore, each transfer assembly 4a, 4b includes a transfer and locking rod 8, extending essentially in the traveling direction of carriages 2 and located outside the furnace in alignment with substantially all successive, jointly operated carriages. As for its material, the transfer and locking rod may be made of steel and have a circular cross-section. Especially in this context, the transfer and locking rod refers to such an elongated element which is capable of withstanding both a compression strain and a tensile stress in the longitudinal direction of the rod. The transfer and locking rod 8 is provided with second locking elements 9. These are arranged in the longitudinal direction of the transfer and locking rod 8 at fixed spaces or distances so that the second locking elements can be in a transfer-force transmitting relationship with the first locking elements 6 included in the carriages 2. The second locking elements 9 are in the form of locking cams, extending transversely, preferably perpendicularly to the longitudinal direction of the transfer and locking rod and having the dimensions thereof selected so as to be positioned accurately in connection with the first locking elements 6. Thus, as the elements 6 and 9 are in a transfer-force transmitting relationship, the carriage 2 is, with the transfer and locking rod 8 in a locking position, prevented from moving in the transfer direction S and in the direction perpendicular thereto, i.e. the movement longitudinally of the furnace is prevented. In other words, the elements 6 and 9 in co-operation thus retain the carriages 2 strictly stationary during a bending cycle to be effected within this particular section. For this purpose, the wedge-shaped groove formation in the first locking element in co-operation with the locking cam provided with a matching wedge-shaped formation is preferred as the carriages 2 can thus be accurately set in a centered position, as illustrated in FIG. 7. A vertical arrow K indicates in FIG. 7 a release and locking direction for the transfer and locking rod 8.

The transfer and locking rod 8 of each transfer assembly 4a, 4b is provided with first elements capable of producing a co-action for the carriages 2 during transfers effected between the sections. For shifting the transfer and locking rod 8 longitudinally such that each carriage 2 progresses into a section downstream, the transfer and locking rod 8 is provided with a first drive element 21 (FIG. 6), such as a toothed rack extending longitudinally of the transfer and locking rod 8, and connected to the transfer and locking rod 8 through a support structure 23 (FIG. 6). Furthermore, the first elements include a transfer unit 10, essentially shown in FIGS. 2–5. The transfer unit 10 includes transfer-force transmitting second drive elements 22 (FIG. 6), such as pinions, each of which is in connection with the first drive element, such as a toothed rack, provided in connection with a different transfer and locking rod 8. The transfer unit 10 is further provided with a power unit 12a, 12b for operating the second drive elements 22 simultaneously for transmitting a transfer force through the first drive elements 21 to the transfer and locking rods in question. For example, as shown in the embodiment of FIGS. 2–5, the power unit may comprise motor units 12a, 12b, mounted on the opposite ends of a shaft 11 and preferably provided with a gear assembly 24 (FIG. 6). The shaft 11 is further provided with a clutch element 13 between the motor units 12a, 12b, whose operation will be described later. As shown especially in FIGS. 2–5, the transfer unit 10 is located preferably in the end section of a furnace transversely to the traveling direction of carriages 2, whereby the second drive elements, such as pinions, mounted on the shaft 11 are fastened to the shaft 11 in such a manner that the clutch element 13 will be located between the second drive elements on the shaft 11.

Moreover, especially in reference to FIG. 1, each transfer assembly 4a, 4b includes second elements 14 for opening and closing a transfer-force transmitting relationship established by the locking elements 6, 9 between the carriages 2 and the transfer and locking rod 8. These second elements 14 may be pressure-medium operated cylinder-piston assemblies, especially pneumatic cylinder-piston assemblies, acting between a sliding beam 25, connected to a furnace frame structure 17 and arranged longitudinally thereof, and the transfer and locking rod 8 and coupled with rotating lugs 15 included in the transfer and locking rod 8. As shown especially in FIGS. 1 and 6, the transfer and locking rod 8 is journalled with an array of bearings 16 to the sliding beam 25 included in the furnace frame structure 17 and extending longitudinally of the furnace. Thus, by using the second elements 14, a locking between the locking elements 6 and 9 can be released for returning the transfer and locking rod and the second locking elements 9 can then be re-clamped to the carriages 2 by using the second elements 14 to rotate the transfer and locking rod 8 in the direction opposite to the opening or release action. The sliding beams 25 have a length substantially equal to that of the transfer and locking rods 8 and are journalled with slide bearing assemblies 26 or the like to the frame structures 17.

As shown especially in FIG. 1, the first 6 and second 9 locking elements are adapted to set in the locking or clamping position thereof in such a manner that between the successive carriages 2 in the transfer direction (arrow S) remains a distance VM. In practice, a distance between two successive second locking elements 9 in the transfer direction exceeds a distance between the corresponding first locking elements 6 and the opposite ends of particular carriages 2 extending perpendicularly to the transfer direction. By using the symbols of FIG. 1, this can be presented such that the dimension M=L1+L2+VM. Thus, the carriages 2 operate as individual units and no forces apply between the end surfaces thereof which would tend to interfere with the transfer actions of carriages 2 and the positioning thereof within the section for a bending cycle.

A pair of bracket members 5 extending longitudinally of and included in each carriage is located in the bottom section of a carriage 2 or a like immediately above the floor of a carriage 2. Thus, the bracket members 5 have a height which is less than the total height of a carriage 2. Hence, the bracket member 5 provides an extension in the lateral direction for the functional element T of a carriage 2 located essentially inside a furnace. The bracket member 5 is, as pointed out hereinabove, fitted with wheels 3 serving as conveying elements. Those are in cooperation with the section of a transfer track located outside the furnace in connection with the conveying elements. The transfer track includes rails indicated in FIG. 1 by reference numerals 18a, 18b. The floors of the bracket member 5 and functional element T together provide a floor structure for the furnace.

Especially in view of providing a sealing between the bracket member 5 and the furnace wall 1, the vertically aligned surfaces of the elements 1 and 5 are provided therebetween with sealing elements 19 so that the sealing elements 19 enable transfer movements of the carriages 2 while maintaining the sealing effect. Such sealing elements 19 may be in form of e.g. a labyrinth packing and/or a drag sealing. As shown especially in FIG. 1, the bracket member 5 has a length which is substantially equal to that of the longitudinal (transfer directional arrow S) side of the carriage 2 and the sealing element 19 is adapted to extend over the entire bracket member length for producing between the furnace wall 1 and the bracket members 5 a sealing zone covering the entire length of the furnace.

Figures 4, 5:
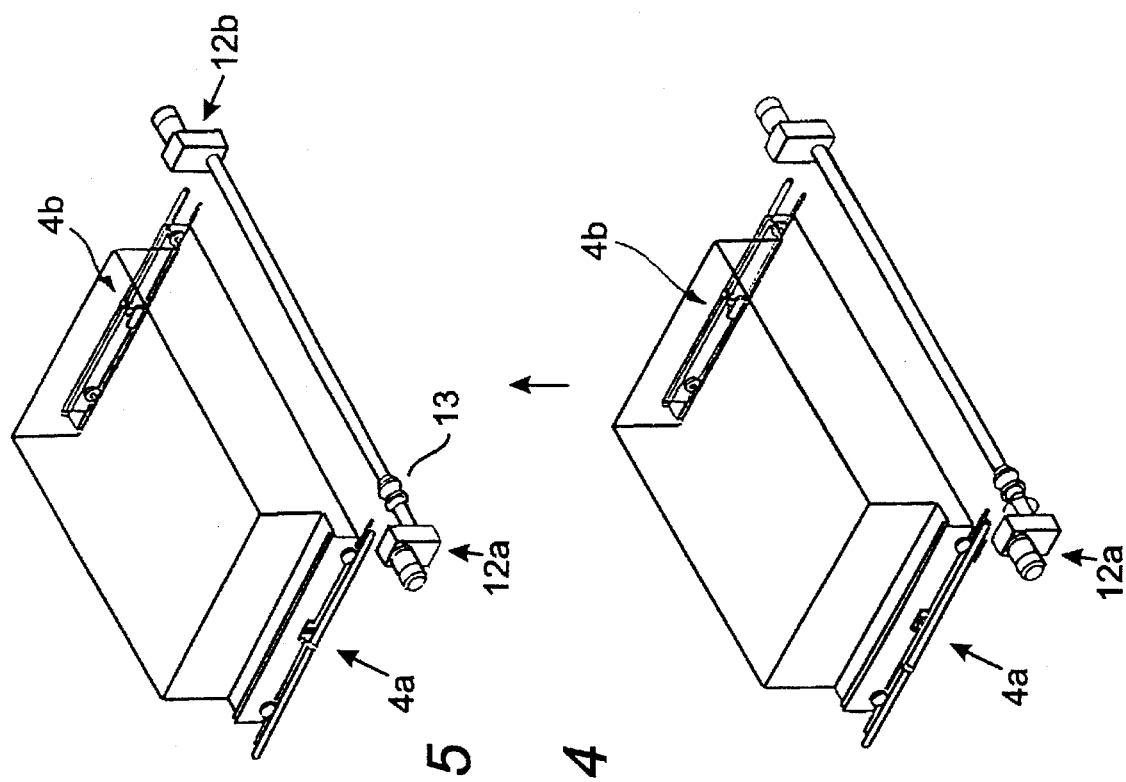
FIGS. 2–5 illustrate sequentially an application of the method by using the embodiment of FIG. 1.
Figures 2, 3:
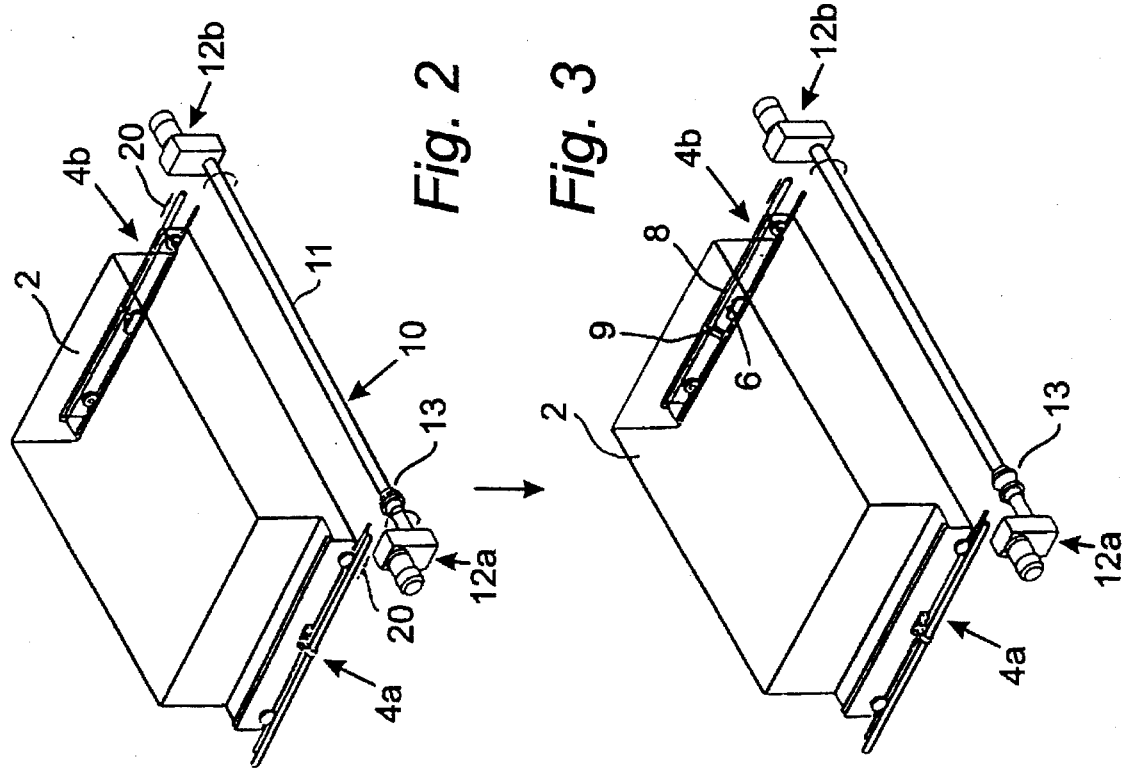

FIGS. 2–5 in particular illustrate the operation of a transfer mechanism. FIG. 2 shows a sequence for carrying the carriages 2 simultaneously to a subsequent section, the transfer being effected by using the entire transfer mechanism, i.e. both transfer assemblies 4a, 4b in the embodiment of FIGS. 2–5. Thus, the first elements (first drive elements 21 and transfer unit 10) are adapted to operate both transfer and locking rods and to displace them in the direction of arrows 20 while the locking elements 6 and 9 in both transfer assemblies 4a, 4b are in a locking position. When the transfer process has been completed with the transfer mechanism, a condition of FIG. 3 will be reached with the carriage in alignment with a section for a subsequent bending cycle and, during the bending cycle, a return of the transfer mechanism can be effected to the transfer commencing position, wherein the first step is to disengage the clutch element 13, which has been engaged in the condition of FIG. 2, for the separate drive of motor units 12a, 12b. The first transfer assembly 4a is maintained locked in the first step and the second elements 14 included in the second transfer assembly 4b are used for rotating the transfer and locking rod 8 to disengage the locking between the locking elements 6 and 9 and the transfer and locking rod 8 is returned by using the motor unit 12 (first and second drive element in action) to the initial position for effecting the locking between the locking elements 6 and 9, as shown in FIG. 4. As illustrated in FIG. 4, when the second transfer assembly 4b is locked, there is performed a transfer of the first 4a transfer assembly to a disengagement position, as described above and shown in FIG. 5. Thus, both transfer assemblies 4a, 4b included in the transfer mechanism are locked or clamped to the carriages 2 through the action of the locking elements 6 and 9. In FIG. 4, the displacement of the first transfer assembly 4a is effected by means of a motor unit 12a whereafter, in FIG. 5, the clutch element 13 can be engaged for the co-action of the motor units for reaching again the condition shown in FIG. 2.

FIG. 6 illustrates the above general configuration in more detail with reference numerals which correspond to the above reference numerals for respective components.

Figure 8:
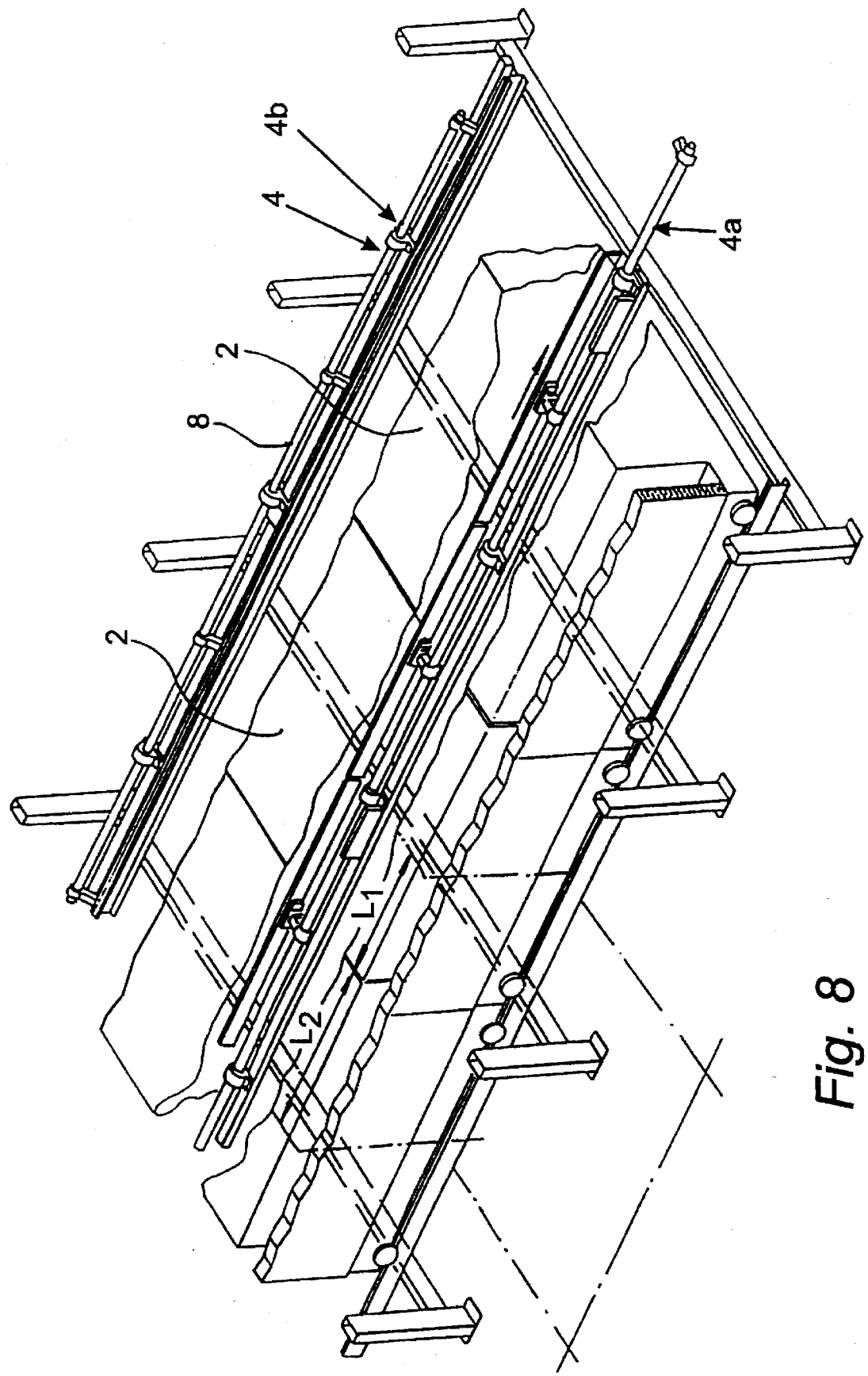
FIG. 8 shows a schematic perspective view of a second embodiment for a sequential bending furnace.

FIG. 8 shows an alternative embodiment for the invention, wherein the actual transfers are effected by using just one transfer assembly 4a, which is otherwise functionally and constructively identical to that shown above in connection with FIGS. 1–7 except that it is positioned below the carriages 2 centrally in the longitudinal direction of a furnace. The second transfer assembly 4b is stationary, i.e. it does not participate in the transfers of carriages, being disengaged from the carriages at that stage, but it is active in the locking of carriages 2 as the latter are stationary. Therefore, the stationary or fixed second transfer assembly 4b provides a locking for the carriages to secure the immobility thereof when returning the first transfer assembly 4a to a transfer commencing position. In the structural sense, the stationary second transfer assembly corresponds otherwise essentially to the movable first transfer assembly 4a with the exception that it can be supported directly on the frame structure 17. Thus, by rotating the transfer and locking rod around its longitudinal axis, as described hereinabove, it can be clamped to the carriages 2 and disengaged therefrom as the carriages 2 are provided with the locking elements 6.

It is obvious that the invention can be modified in many ways. If necessary, for example, one or some of the movable transfer assemblies can be converted into a stationary assembly by disengaging it from the force transmitting connection with the transfer unit 10 and by disengaging this particular transfer assembly from the carriage 2 for the duration of transfers. Thus, when this particular temporarily stationary transfer assembly is clamped to the carriages 2, the other transfer assemblies, which have effected the actual transfer, can be carried simultaneously to a transfer commencing position. Such an alternative combination may be in the form of an assembly which, in addition to the embodiment of FIG. 1, includes a transfer assembly which is stationary or, if necessary, can be disengaged to be stationary, e.g. a transfer assembly positioned underneath the carriages, as shown in FIG. 8. It is obvious that the number of stationary transfer assemblies can be more than one.

We claim:

1. A method in a sequential bending furnace for bending glass sheets, the furnace arrangement for applying the method comprising:

a sequence of successive sections, at least some of which are provided with heating elements for applying a thermal effect to a glass sheet to be bent for heating and bending the glass sheet sequentially during bending cycles effected in said sections, a sequence of carriages fitted with wheels or other conveying elements and arranged successively on a transfer track associated with the furnace, whereby the glass sheets to be bent are laid in contact with bending molds associated with the carriages, and a transfer mechanism for carrying the carriages simultaneously forward in the furnace into a section further away in the advancing direction of the carriages for a subsequent bending cycle included in the bending process, said method comprising the following steps:

(1) providing the furnace with at least two essentially extra-furnace transfer assemblies for building a transfer mechanism, each transfer assembly including:

at least one first locking element in each carriage mounted on a bracket member included in the carriage and communicating with the exterior of the furnace in such a manner that the first locking element is located outside the furnace walls, a transfer and locking rod extending essentially in the advancing direction of the carriages and located in alignment with essentially all successive jointly operated carriages and fitted outside the furnace, and second locking elements associated with the transfer and locking rod and arranged in the longitudinal direction of the transfer and locking rod at fixed spaces for providing a transfer and locking force transmitting relationship with the first locking elements included in the carriages;

(2) advancing the carriages into a section downstream of the furnace as seen in the traveling direction of the carriages by operating at least one transfer assembly, the first and second locking elements being in said relationship transmitting a transfer force in said at least one transfer assembly, (3) releasing the first and second locking elements and returning the transfer and locking rods of the transfer assemblies to a transfer commencing position so that at least one transfer assembly is in the locking position during the return actions, and (4) clamping the second locking elements included in the transfer and locking rods returned to the position for commencing a transfer of the carriages to the first locking elements included in the carriages for the next transfer of carriages effected between the sections.

2. A method as set forth in claim 1, wherein the transfers of the carriages are effected by at least two transfer assemblies, which are in a transfer-force transmitting relationship during the course of a transfer.

3. A method as set forth in claim 1, wherein at least one of the transfer assemblies is stationary in a manner that said at least one transfer assembly is active in immobilizing the carriages and said at least one stationary transfer assembly is disengaged from the connection with the carriages for the duration of transfers.

4. A method as set forth in claim 1, wherein a transfer of the carriages is effected by at least two transfer assemblies and wherein the transfer assemblies are returned alternately to a transfer commencing position.

5. A sequential bending furnace arrangement for bending glass sheets, comprising:

a sequence of successive sections, at least some of which are provided with heating elements for applying a thermal effect to a glass sheet to be bent for heating and bending it sequentially during bending cycles effected in said sections, a sequence of carriages fitted with wheels or other conveying elements and arranged on a transfer track associated with the furnace, whereby the glass sheets to be bent are laid in contact with bending molds associated with the carriages, and a transfer mechanism for carrying the carriages simultaneously forward in the furnace into a section further away in the advancing direction of the carriages for a subsequent bending cycle, the transfer mechanism including at least two transfer assemblies, including:

at least one first locking element in each carriage mounted on a bracket member included in the carriage and communicating with the exterior of the furnace so that the first locking element is located outside the furnace walls, a transfer and locking rod, extending in the advancing direction of the carriages and located in alignment with essentially all successive jointly operated carriages and also fitted outside the furnace walls, second locking elements associated with the transfer and locking rod and arranged in the longitudinal direction of the transfer and locking rod at fixed spaces to provide a transfer and locking force transmitting relationship with the first locking elements included in the carriages, first elements for advancing the successive carriages simultaneously into a section downstream in the traveling direction by means of a longitudinal transfer action of the transfer and locking rod, said first and second locking elements being in a transfer-force transmitting relationship in at least one of the transfer assemblies, and second elements for opening and closing a transfer and locking force transmitting relationship provided by the locking elements between the carriages and the transfer and locking rod.

6. A sequential bending furnace as set forth in claim 5, wherein the transfer and locking rods are adapted to be alternately returned to a position for commencing a transfer of the carriages by the first elements.

7. A sequential bending furnace as set forth in claim 5, wherein the transfer mechanism includes at least two transfer assemblies located essentially outside the furnace on at least one of the following (1) at least one side of and (2) underneath the carriages.

8. A sequential bending furnace as set forth in claim 5, wherein at least one of the transfer assemblies is stationary and immobile in the longitudinal direction of the furnace so that it participates in locking the carriages by the locking elements as said carriages are stationary.

9. A sequential bending furnace as set forth in claim 5, wherein the first elements of said transfer mechanism include a combination comprising:

a first drive element, transmitting a transfer force and associated with the transfer and locking rod, and a transfer unit, including second drive elements, transmitting a transfer force, each of said second drive elements being arranged in connection with the first drive element associated with a different transfer and locking rod, and wherein a power unit is provided for operating the second drive elements for simultaneously transmitting a transfer force through the first drive elements to the relevant transfer and locking rods.

10. A sequential bending furnace as set forth in claim 9, wherein the transfer unit further includes a shaft extending longitudinally of the furnace and essentially aligned with the transfer and locking rods and provided with the second drive elements which position themselves in a transfer-force transmitting relationship with the first drive elements associated with the transfer and locking rod, and wherein said power unit comprises at least one motor unit for rotating said shaft.

11. A sequential bending furnace as set forth in claim 10, wherein the shaft includes at least one clutch element for disengaging each transfer and locking rod and the drive elements associated therewith alternately from the shaft for retaining the relevant transfer and locking rod in a locking position as returning at least one transfer and locking rod, coupled at that moment with the power unit, to a position for commencing a transfer of the carriages and locking the same in connection with the carriages.

12. A sequential bending furnace as set forth in claim 5, wherein the transfer and locking rod is rotatable around its longitudinal axis by means of the second elements for releasing a transfer-force transmitting relationship between the first and second locking elements and for re-establishing a transfer-force transmitting relationship therebetween.

13. A sequential bending furnace as set forth in claim 5, wherein the first and second locking elements are adapted to be set in a locking position so that between the successive carriages a distance (VM) remains in the transfer direction.

14. A sequential bending furnace as set forth in claim 5, wherein the bracket member is located in the bottom section of the carriage immediately above the floor of the carriage so as to extend from a functional element included in the carriage, and wherein the first locking element is mounted on a substantially vertical side surface of the bracket member and is located outside the furnace.

15. A sequential bending furnace as set forth in claim 5, wherein the bracket member, on the vertical side surface thereof, is fitted with wheels which are in co-operation with a section of a transfer track located outside the furnace.

16. A sequential bending furnace as set forth in claim 5, wherein sealing elements are fitted between the bracket member and the vertically aligned surfaces of the furnace wall to enable transfers of the carriages.

17. A sequential bending furnace as set forth in claim 16, wherein the sealing elements comprise at least one of a labyrinth packing and a drag sealing.

18. A sequential bending furnace as set forth in claim 16, wherein the bracket member has a length substantially equal to that of the side of the carriage and wherein the sealing elements are adapted to cover the entire length of said bracket member.

19. A sequential bending furnace as set forth in claim 14, wherein the power unit includes two motor units capable of independent operation and wherein the clutch element is mounted on the shaft between the second drive elements.

* * * * *